United States Patent
Reigl

(10) Patent No.: US 7,037,065 B2
(45) Date of Patent: May 2, 2006

(54) FLANGE BOLT FOR TURBINES

(75) Inventor: Martin Reigl, Untersiggenthal (CH)

(73) Assignee: Alstom Technology LTD, Baden (CH)

( * ) Notice: Subject to any disclaimer, the term of this patent is extended or adjusted under 35 U.S.C. 154(b) by 51 days.

(21) Appl. No.: 10/291,394

(22) Filed: Nov. 12, 2002

(65) Prior Publication Data

US 2003/0180140 A1    Sep. 25, 2003

Related U.S. Application Data

(60) Provisional application No. 60/365,620, filed on Mar. 20, 2002.

(51) Int. Cl.
  *F01D 25/10* (2006.01)
  *F01D 25/12* (2006.01)

(52) U.S. Cl. ......................... 415/47; 415/116; 415/175; 415/178; 415/214.1; 403/34; 403/37; 403/23; 403/335; 403/337; 403/338; 285/47; 285/368; 285/412; 411/389; 411/395; 411/537; 411/544

(58) Field of Classification Search ................ 415/47, 415/175, 214.1, 177–180, 213.1, 116; 403/34, 403/37, 23, 335–338; 285/13–14, 47, 190, 285/368, 412; 411/395, 389, 537, 538, 544
  See application file for complete search history.

(56) References Cited

U.S. PATENT DOCUMENTS

| | | | |
|---|---|---|---|
| 1,873,743 A | * | 8/1932 | Doran ................... 415/213.1 |
| 1,957,700 A | | 5/1934 | Dahlstrand |
| 2,320,398 A | * | 6/1943 | Zetterquist .................. 403/34 |
| 3,209,640 A | * | 10/1965 | Waivers ...................... 411/395 |
| 3,245,708 A | * | 4/1966 | Kooistra ..................... 403/337 |
| 4,184,785 A | * | 1/1980 | Marjollet et al. ........... 403/337 |
| 4,884,934 A | | 12/1989 | Ikeda et al. |
| 5,133,641 A | * | 7/1992 | Groenendaal et al. ... 415/213.1 |
| 6,273,675 B1 | | 8/2001 | Magoshi et al. |

FOREIGN PATENT DOCUMENTS

| | | |
|---|---|---|
| CH | 306453 | 4/1955 |
| CH | 385248 | 12/1964 |
| DE | 540678 | 12/1931 |
| DE | 3733243 A1 | 4/1988 |
| JP | 11-166520 * | 5/1997 |

* cited by examiner

*Primary Examiner*—Christopher Verdier
(74) *Attorney, Agent, or Firm*—Buchanan Ingersoll PC

(57) ABSTRACT

An arrangement for cooling or heating of a flange bolt for turbines comprises one or more boreholes, that extend through the bolt, and inlet and outlet pipes that are connected to each end of the borehole. A cooling or heating medium such as air, steam or any other fluid flows through an inlet pipe into and through the borehole thereby cooling or heating the bolt, and exits from the borehole via an outlet pipe. The cooling or heating arrangement enables direct cooling or heating of the bolt itself and ensures stable bolting forces throughout the operation of the turbine. The flange bolts with this arrangement may be applied to gas turbines or steam turbines operated at elevated steam temperatures and pressures.

13 Claims, 8 Drawing Sheets

United States Patent US 7,037,065 B2

FLANGE BOLT FOR TURBINES

This application claims priority under 35 U.S.C. § 119 to U.S. Provisional Application No. 60/365,620 entitled Flange Bolt for Turbines and filed on Mar. 20, 2002, the entire content of which is hereby incorporated by reference.

FIELD OF THE INVENTION

The invention pertains to flange bolts applied to turbines and in particular to an arrangement for cooling and heating of such flange bolts and to a control system for operating the arrangement.

BACKGROUND OF THE INVENTION

Flange bolts are used to press together various components of a turbine, as for example a turbine casing, pipes or other joints.

A turbine casing comprises flanges that are integral parts of the casing and intended to hold together the upper and lower halves of the casing when it is under pressure. One half of the casing comprises an upper flange half and the other half a lower flange half, which are pressed together by flange bolts and flange nuts. The two flange halves are pressed together by means of bolting forces, which ensures that no steam or gas leaks out of the casing. A cross-section of a casing of a gas or steam turbine with such flange bolts is shown in FIG. 1. The turbine is enclosed by an inner casing having an upper half 31 and a lower half 33, which are held together by a flange having an upper and lower half 32 and 34, respectively. The two flange halves are an integral part of the inner casing and are pressed together by the bolting force given by the bolts and nuts 35 so that no fluid leaks out at the flange plane 36 between the upper and lower half of the inner casing. Similarly, the outer casing comprises an upper half 21 and a lower half 23, which are pressed together by a flange with an upper half 22 and lower half 24. The upper and lower flange halves 22 and 24 are pressed together by bolts and nuts 25 such that no steam or gas leaks out at the flange plane 26 that extends between the upper and lower halves of the outer casings.

At elevated temperatures the bolts can relax and the bolting forces diminish as a function of time. If the temperature is too high, the bolting forces diminish at such a fast rate that the bolts no longer keep the outer casing closed sufficiently tight.

U.S. Pat. No. 6,273,675 discloses an arrangement for cooling a flange applied to the outer casing of a steam turbine comprising pipes placed in the insulation of the casing and contacting the outer edge of the flange. Heat is transferred by natural convection to the air in the pipes. The bolts are cooled indirectly via the flange and the pipe in the insulation. The same patent discloses another known method of cooling the outer casings, where the flange contains a boring, through which air can flow and cool the flange by natural convection.

These cooling arrangements are arranged in the flange such that primarily the flange is cooled and the bolts are only cooled indirectly via the flange. The steam inside the casing warms the flange, which limits the cooling effect on the bolts via the flange. In addition, the cooling effect by means of natural convective airflow is limited due to its limited flow velocity. These arrangements are furthermore associated with a relatively large heat loss because much heat has to be transported out of the flange in order to cool the bolts. These cooling arrangements are only applicable to the outer casings of turbines. They are not suitable for inner casings because, typically steam flows around the inner casings, whereby cooling air is not available for convective cooling.

It is furthermore known in turbine technology to provide bolts with a central boring in order to allow heating of the bolts using heating rods that are inserted into the central boring. The method furthermore allows measurement of the bolt's length before and after the installation of the turbine. The bolts are heated and thereby lengthened in order to allow the turning of the nuts by a given predetermined distance without force. Prior to the start of turbine operation, the heating rods are removed and the bolts cool off. The bolts then have an initial tension. The heating of the bolts by this method enables a sufficient tightening of the bolts.

SUMMARY OF THE INVENTION

It is the object of this invention to provide an arrangement for cooling or heating of flange bolts for turbines that ensures an improved stabilization of the bolting forces throughout the operation of the turbine.

In particular, the flange bolts with such an arrangement are to be successfully applied to to gas turbines or steam turbines that are operated at elevated steam or gas temperatures and pressures.

It is a further object of the invention to provide a system for controlling the mass flow of a fluid through the heating or cooling arrangement.

According to the invention, a cooling or heating arrangement for a bolt that fastens an upper and lower half of a flange in a turbine and is positioned in a boring that extends through the two halves of the flange, comprises one or more boreholes that extend through the bolt. The arrangement comprises furthermore one or more inlet pipes and one or more outlet pipes that are connected to the ends of each borehole. The pipes serve as inlet and outlet for a cooling or heating fluid to flow through each borehole.

In a preferred embodiment of the invention, the one or more boreholes extend axillay through the bolt. In further embodiments, additional boreholes extend in the radial direction away from an axial borehole.

A cooling or heating fluid such as air, steam or any other fluid flows through an inlet pipe into and through a borehole thereby cooling or heating the bolt, and exits from a borehole via an outlet pipe. The cooling or heating medium flows either naturally or forced providing cooling or heating by convection. For a forced fluid flow, forced air can be provided, for example, by means of a ventilators or fan. Such a ventilator or fan is positioned before or in an inlet pipe thus creating an overpressure in the inlet pipe. Alternatively, the ventilator or fan is positioned in or after an outlet pipe effecting an underpressure in said outlet pipe.

Forced fluid flow may furthermore be provided using forced steam, for example, by means of steam extraction from the turbine. For this, the inlet pipe is connected to an extraction line leading from the inside of the inner casing of the gas or steam turbine. This cooling or heating arrangement enables a direct and thus more efficient cooling or heating of the bolt itself. As such, it is improvement over the indirect cooling described in the state of the art.

The cooling of the flange bolt by means of this arrangement, effects a damping of the bolt's relaxation and ensures that the bolting forces remain stable during the entire steady-state operation of the turbine. Furthermore, due to the stabilized temperature of the bolt, a change of the bolt force due to thermal expansion remains limited during transient operations.

During a start-up of the turbine, heating of the flange bolts can reduce the stresses that are caused by the temperature difference between the bolts and the flange due to thermal expansion. The flange, which is an integral part of the turbine casing, warms up faster than the bolt due to the pressurized fluid inside the casing. The heating of the bolt serves to compensate the temperature difference between the hot flange and the relatively cooler bolt during turbine start-up.

As cooling or heating media either ambient or preheated air or steam, for example extracted from specific points of the turbine, can be used. Other cooling or heating media may also be used. For example, in the case of bolts that are sensitive to corrosion, nitrogen can be used instead of air.

The cooling or heating arrangement according to the invention can effect the following advantages:

The limit for application of the bolt is raised to higher temperatures and higher casing pressures.

Smaller and less costly bolts and flanges may be used.

Less costly bolt materials may be used.

The time increments between maintenance and revision of the bolts may be increased.

Leaky flanges can be tightened by installing the cooling or heating arrangement at a later stage following its initial installation.

Flange bolts are more robust with respect to transient operations because, due to a smaller necessary initial cold bolt stress, a larger allowable stress portion for thermal differential expansions of the bolt and flange remains.

Smaller thermal stresses develop due to a heating of the bolts during start-up

The heat loss through flange is reduced compared to the arrangement according to U.S. Pat. No. 6,273,675.

The arrangement according to the invention is suitable not only for gas turbines but also for steam turbines that are operated using conventional as well as extreme steam parameters.

The invention is applicable for example to the following turbine components, whereby it is understood that this list is not exhaustive: pipe flange joints, flange joints between valves and turbine casings, horizontal or vertical flanges for turbine outer casings, flanges for turbine inner casings, flanges for blade carriers, and flanges for seal carriers.

The arrangement for cooling or heating of the flange bolts can be operated with or without a control system. A control system for operation of the cooling arrangement controls, for example, the mass flow of the cooling or heating fluid. It comprises a controller, one or several temperature measurement devices, and a valve. The temperature of the cooling or the heating fluid is measured at a point after it has passed through the bolt. In the case that the fluid temperature is not known at a point before it enters the bolt, that temperature must also be measured. The controller calculates the amount of heat given to or removed from the bolt, using the mass flow of the fluid and the difference between the fluid temperature before and after the bolt. The setting of the valve, which is arranged in the pipe for the fluid before or after the bolt regulates the amount of fluid flowing through the pipe and is controlled according to the measured fluid temperature differences and the fluid mass flow.

DETAILED DESCRIPTION OF THE INVENTION

Figure 1:
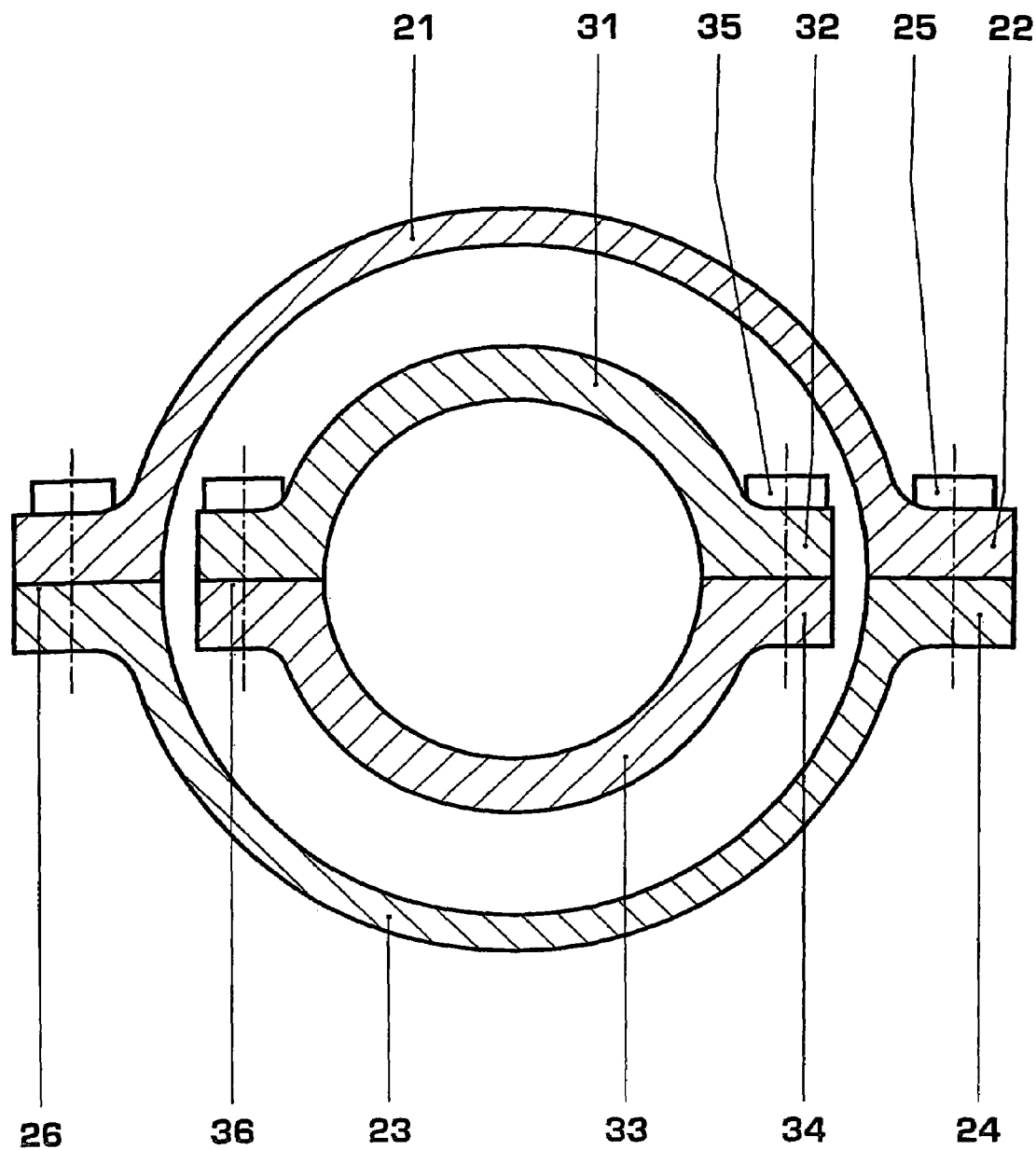
FIG. 1 shows a cross-section of a turbine according to the state of art, to which the bolt arrangement according to the invention may be applied.

FIG. 1 is described above in connection with the state of the art.

Figure 2:
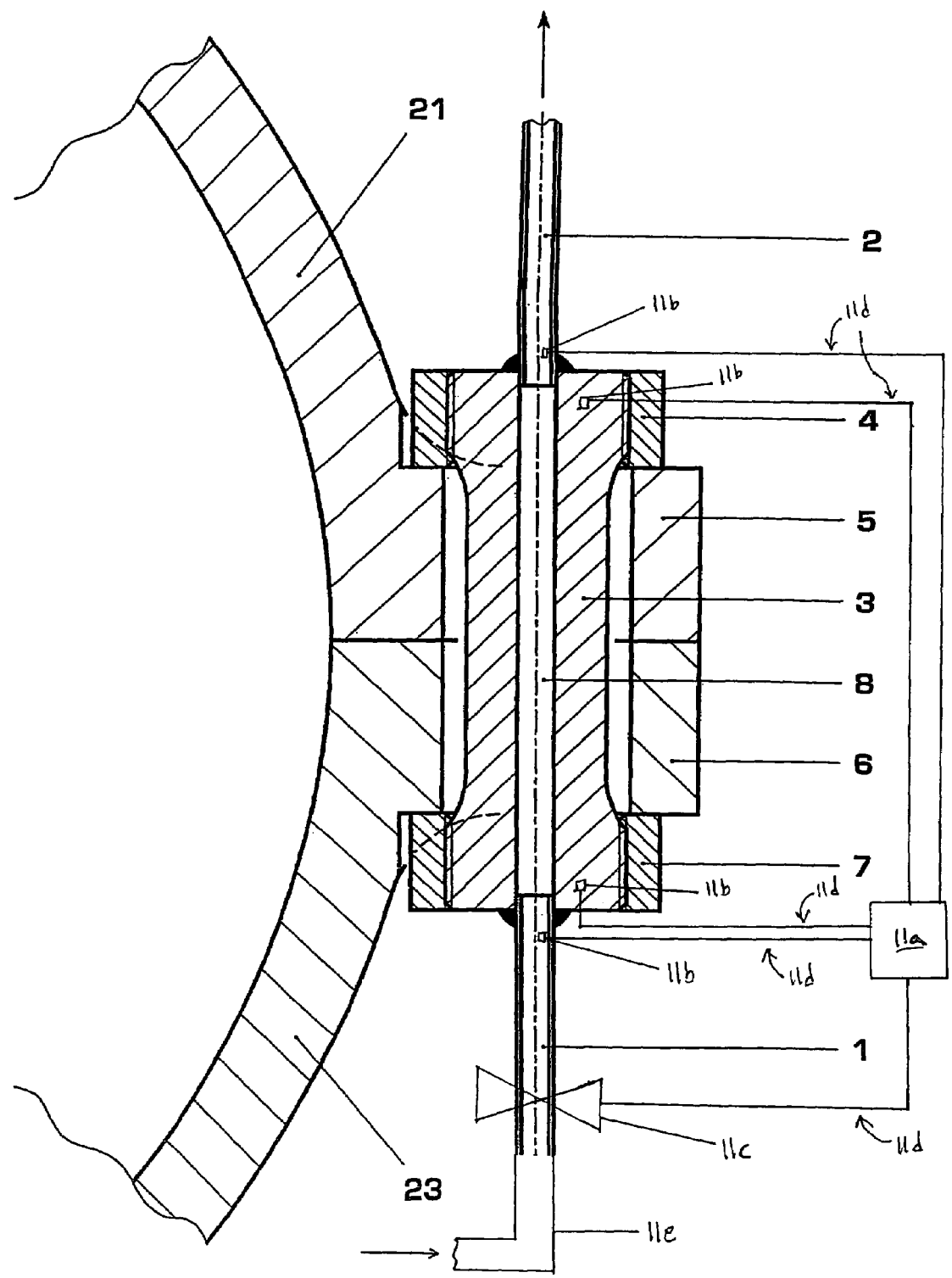
FIG. 2 shows a cross-section of an arrangement for the cooling or heating of a through-bolt having an axial boring.

The following variants of the invention are disclosed in connection with a cooling medium flowing through the flange bolts. In accordance with the disclosure above, all of these descriptions may also be understood in connection with a heating medium. The arrangements shown in FIGS. 2–7 are for a bolt in a flange pressing together the two halves of a turbine casing. In all cases this casing can be either an outer or inner turbine casing. FIG. 2 shows in cross-section an upper and lower flange part 5 and 6 arranged to press together the upper and lower halves 21, 23 of an outer turbine casing with a bolt 3 and upper and lower nuts 4 and 7, respectively.

In all the variants of the arrangement according to the invention.

The arrangement for the cooling of the bolt, according to the preferred embodiment of the invention, comprises a borehole 8 extending along the longitudinal axis.

An inlet pipe 1 is connected to one end of the borehole providing an inlet for a cooling or heating fluid. The fluid for this arrangement as well as for the cooling or heating arrangements shown in the FIGS. 2–6 can be any gas or liquid, as for example air, steam, or nitrogen. The fluid flows through the borehole 8 and cools or heats the bolt 3 by natural or forced convection. It then leaves the arrangement via an outlet comprising an outlet pipe 2 that is connected to the borehole 8 at the other end of the bolt 3. Means for effecting a forced fluid flow through the borehole 8, such as a ventilator or fan 1c, is placed either in or before the inlet pipe or in or after the outlet pipe 2. A control system for operating the cooling arrangement can control the temperature by controlling the mass flow of the cooling or heating fluid. The control system can comprise a controller 11a, one or several temperature measurement devices 11b, and a valve 11c. The temperature of the cooling or the heating fluid is measured at a point after it has passed through the bolt 3. The controller 11a calculates the amount of heat given to or removed from the bolt 3, and regulates the mass flow with the valve 11c. The controller 11a is connected to the measuring devices 11b and the valve 11c via communication lines 11d. An inlet pipe 11e for extraction of pressurized fluid from a turbine is shown in FIG. 2.

While the heat from the bolt is removed directly away from the bolt via the cooling fluid, the heat loss via the flange remains small.

Figure 2A:
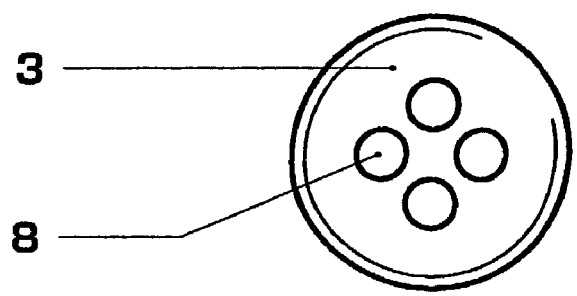
FIG. 2a shows a cross-section of the flange bolt along line IIa having several axial boreholes.
Figure 2B:
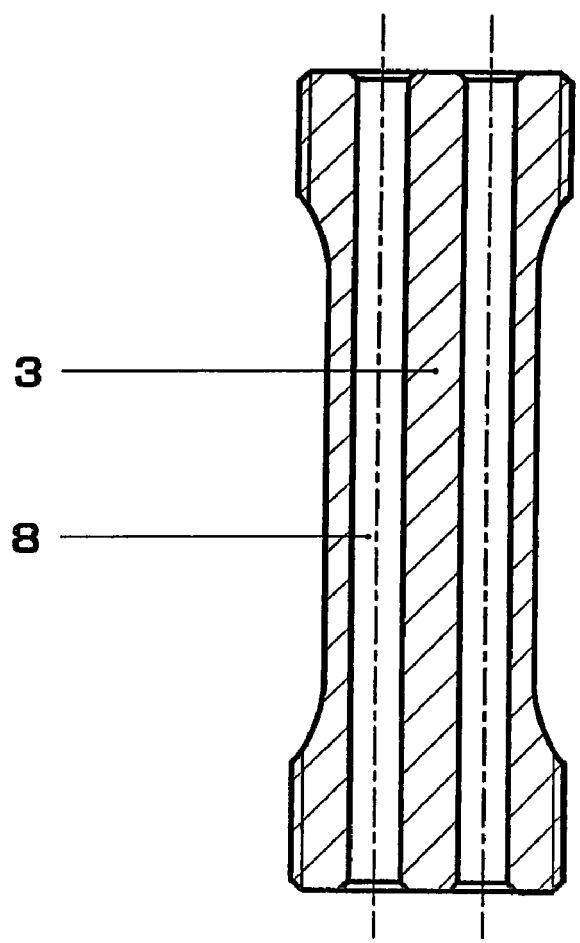
FIG. 2b shows a cross-section of the flange bolt along line IIb having several axial boreholes.

FIGS. 2a and 2b show the cross-section perpendicular to and along the longitudinal axis of a flange bolt, respectively. This variant of the arrangement for cooling or heating comprises four axial boreholes 8 arranged symmetrically about the longitudinal axis and extending throughout the length of the bolt 3.

Figure 3:
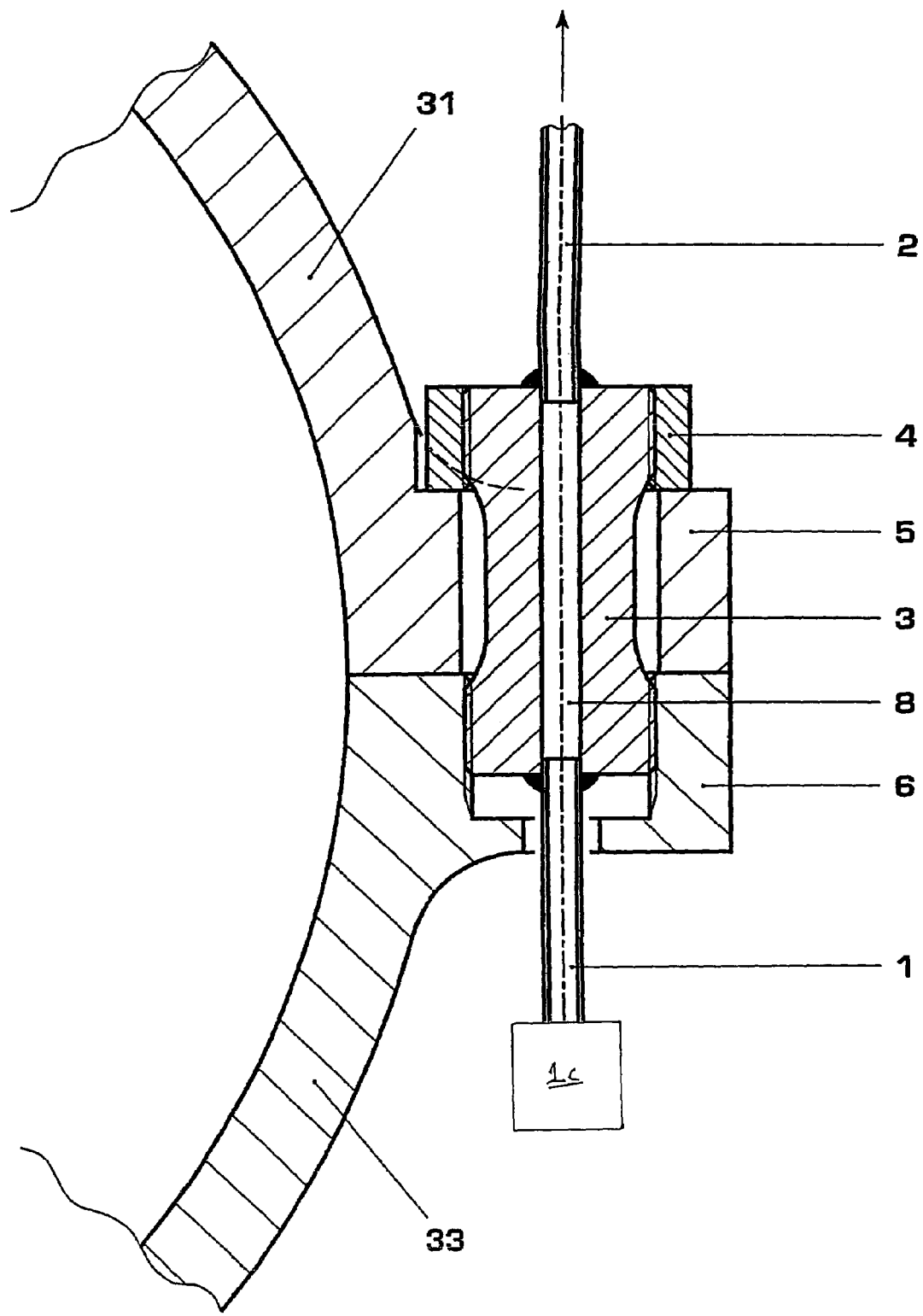
FIG. 3 shows a cross-section of an arrangement for the cooling or heating of a bolt for a flange with a blind pocket.

This cooling or heating arrangement is applicable to through-bolts that reach through the entire flange and are tightened with an upper nut 4 as well as a lower nut 7 as shown in FIG. 2. They can also be applied to bolts placed in a blind or pocket hole and tightened with a single nut 4 as shown in FIG. 3. Bolts in a pocket hole have a larger bolt-flange contact area at the thread compared to the contact area between bolts and nuts and the flange of through-bolts. For this reason, the cooling arrangement applied to through-bolts effects a more efficient cooling and lower bolt temperature compared to a cooling arrangement applied to bolts in a pocket-hole.

Figure 4:
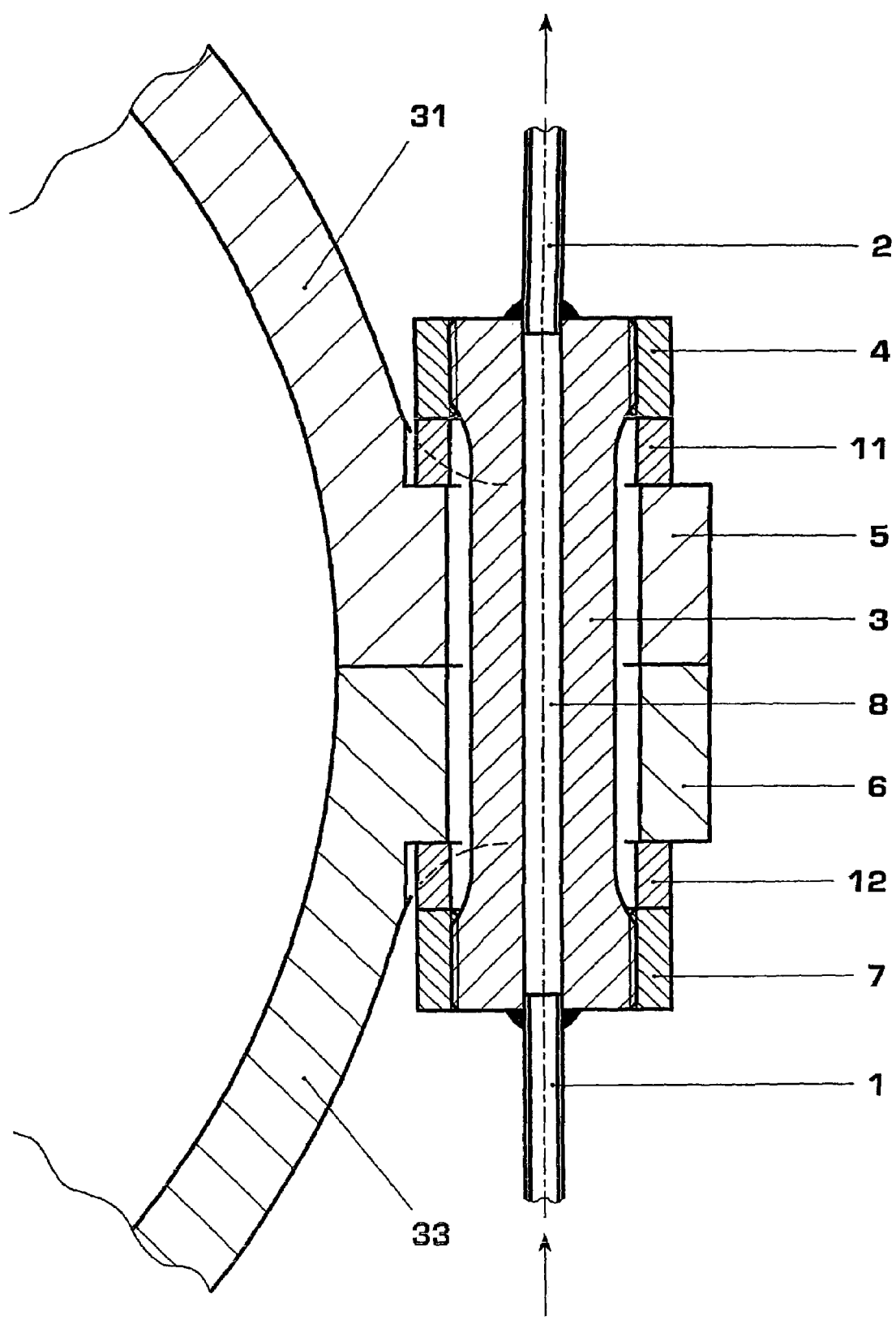
FIG. 4 shows a cross-section of an arrangement for the cooling or heating of a bolt for a flange with resilient sleeves.

FIG. 4 shows a bolt 3 that fastens an upper and lower flange 5 and 6. The bolt and flange are fastened by means of nuts 4 and 7. An upper resilient sleeve 11 is placed between the upper flange part 5 and the upper nut 4, and a lower resilient sleeve 12 is placed between the lower flange part 6 and the lower nut 7. The bolt comprises a similar cooling arrangement with an axial borehole 8 as shown in FIGS. 1 and 2. Applied to a bolt with resilient sleeves 11, 12, the heat flux from the casing into the bolt is further reduced due to the greater thermal resistance due to adding the sleeves. For this reason, the cooling effect by means of the axial borehole is increased. This variant may also be realised using only one resilient sleeve.

The cooling arrangement effects that the bolting force of the bolt does not drop as much following a non-steady state operation of the turbine. For example, during start-up of a turbine with flange bolts that are not cooled, the flange heats up faster than the bolt, because the heat must first flow through the flange before it can reach the bolt. Due to the thermal expansion of the flange, the bolting force will first increase. Once the bolt has also heated up and thermally expanded, the bolting force is then decreased again. For flange joints with a cooling or heating arrangement according to the invention, the decrease of the bolting force is reduced because the bolt does not heat up as much and its thermal expansion remains accordingly small. For the same bolting force during steady state operation of the turbine, the bolts with cooling or heating arrangements according to the invention therefore require a smaller pre-stress than bolts without this arrangement. Because the steam turbine casings are preheated, which increases the bolt stress, the smaller stress in the cold state has no disadvantage. Rather, it is advantageous that greater temperature transients are permissible because, due to the lower pre-stress, any additional stress due to the differing thermal expansions of the flange and bolt may now be larger.

For steam-tempered bolts for the inner turbine casing there is a further advantageous effect. The steam that cools the bolts during turbine operation is warmer than the bolts during start-up. Therefore, the bolts are heated up during start-up by means of the steam flowing through the axial borehole. Then, the otherwise high stresses due to the typical large temperature difference between bolt and flange during start-up are now kept small due to the smaller temperature difference. As the risk with respect to plastic deformation during the start-up diminishes, a larger pre-stress can be applied. Maintaining this effect, smaller bolts may be used for flange joints provided they have the cooling or heating arrangement according to the invention.

Figure 5:
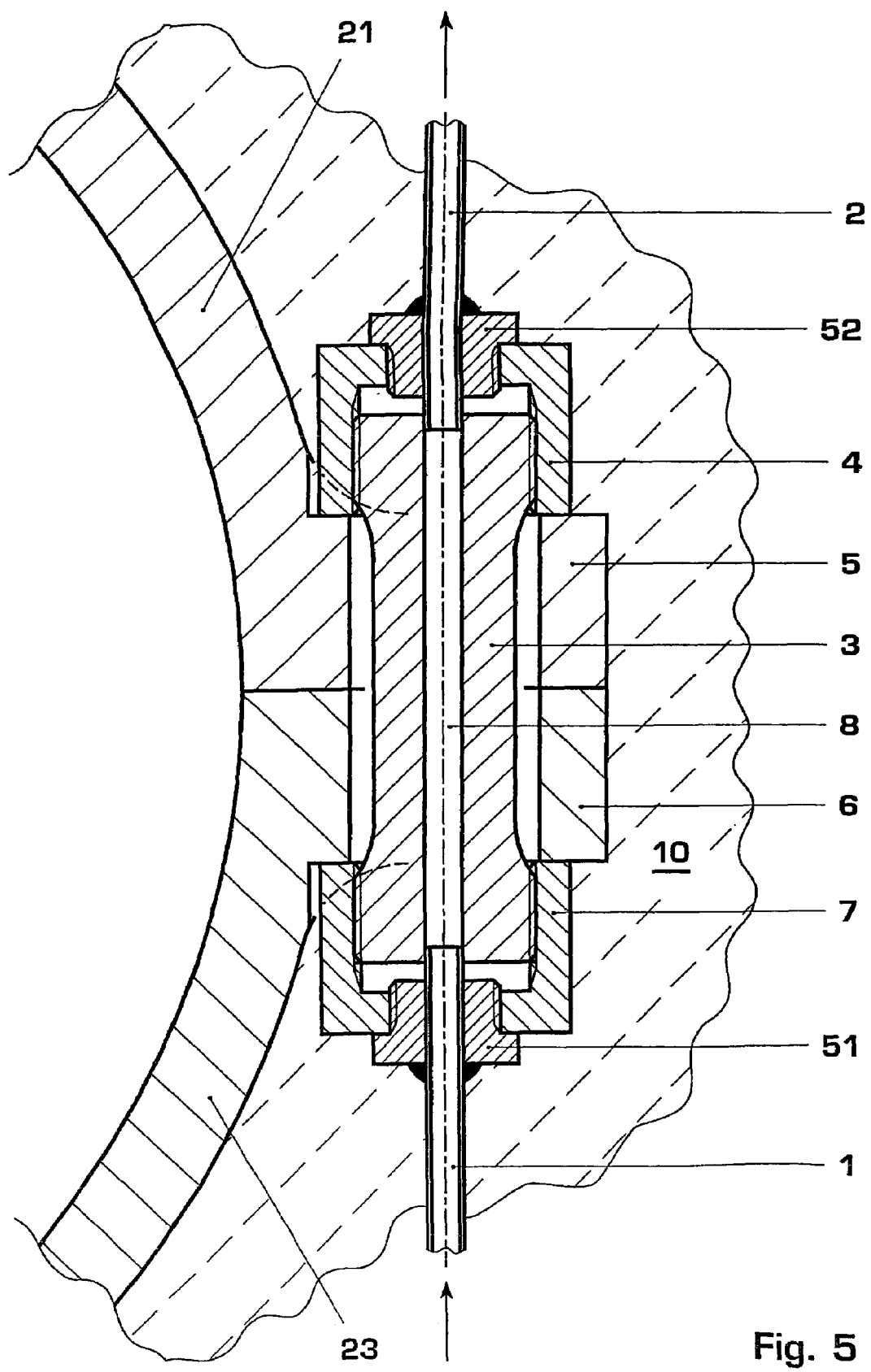
FIG. 5 shows a cross-section of an arrangement for the cooling or heating of a bolt for a flange applied to an insulated outer casing of a turbine.

FIG. 5 shows the application of the invention to the insulated outer casing or pipe flanges of a steam turbine. The flange and bolt include encapsulated nuts 4, 7 and locking screws 51 and 52, which serve to prevent insulation material from entering the bolt thread, and to allow the assembly of the pipes 1 and 2 after tightening the bolt 3. This variant of the invention is likewise applicable to an insulated inner casing. The variant may also be realised by using only one locking screw and one encapsulated nut.

The flow of the cooling medium through the axial boreholes can be realized by either forced or natural convection. A forced convection can be realized, for example, by means of an overpressure in the inlet pipe that is created by a ventilator. For a natural convection, straight vertical inlet and outlet pipes are preferred.

The cooling and heating arrangement according to the invention can also be applied to the bolt and flange joints for inner turbine casings, carriers for stationary and rotating blades as well as seal carriers. For these applications, steam with a small overpressure can be extracted at a suitable point in the casing and led to the inlet pipes of the arrangement.

Figure 6:
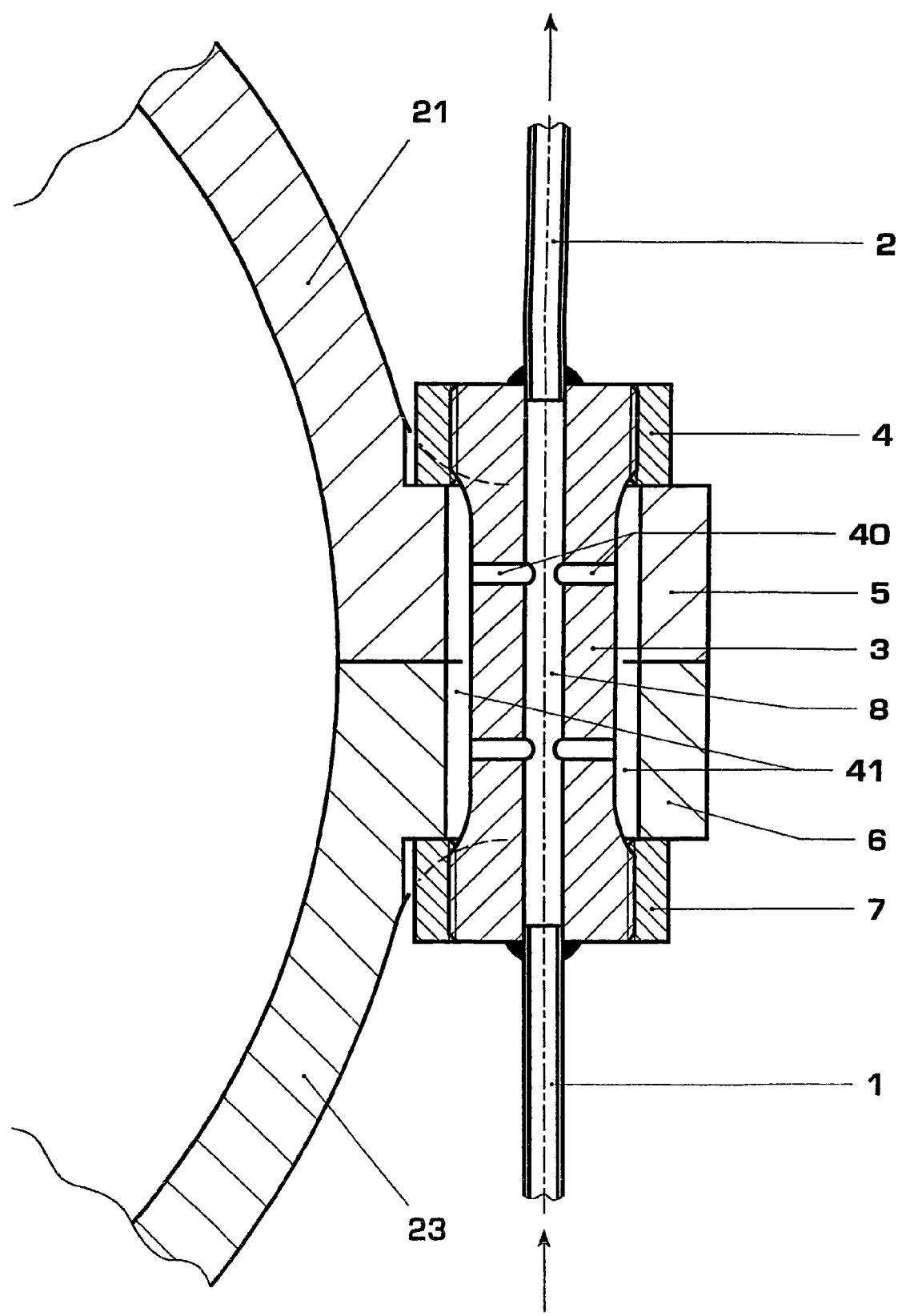
FIG. 6 shows a cross-section of an arrangement for the cooling or heating of a bolt for a flange with axial as well as radial bores.

FIG. 6 shows a further embodiment of the invention. The arrangement for cooling or heating the bolt for a flange comprises not only an axial bore hole 8, but also one or more radial bore holes 40 that extend from the axial bore hole 8 towards the outside of the bolt shaft. The cooling medium that flows from the axial hole into the radial holes 40, exits into the flange boring 41 and exits from the arrangement through the thread of the bolt.

Figure 7:
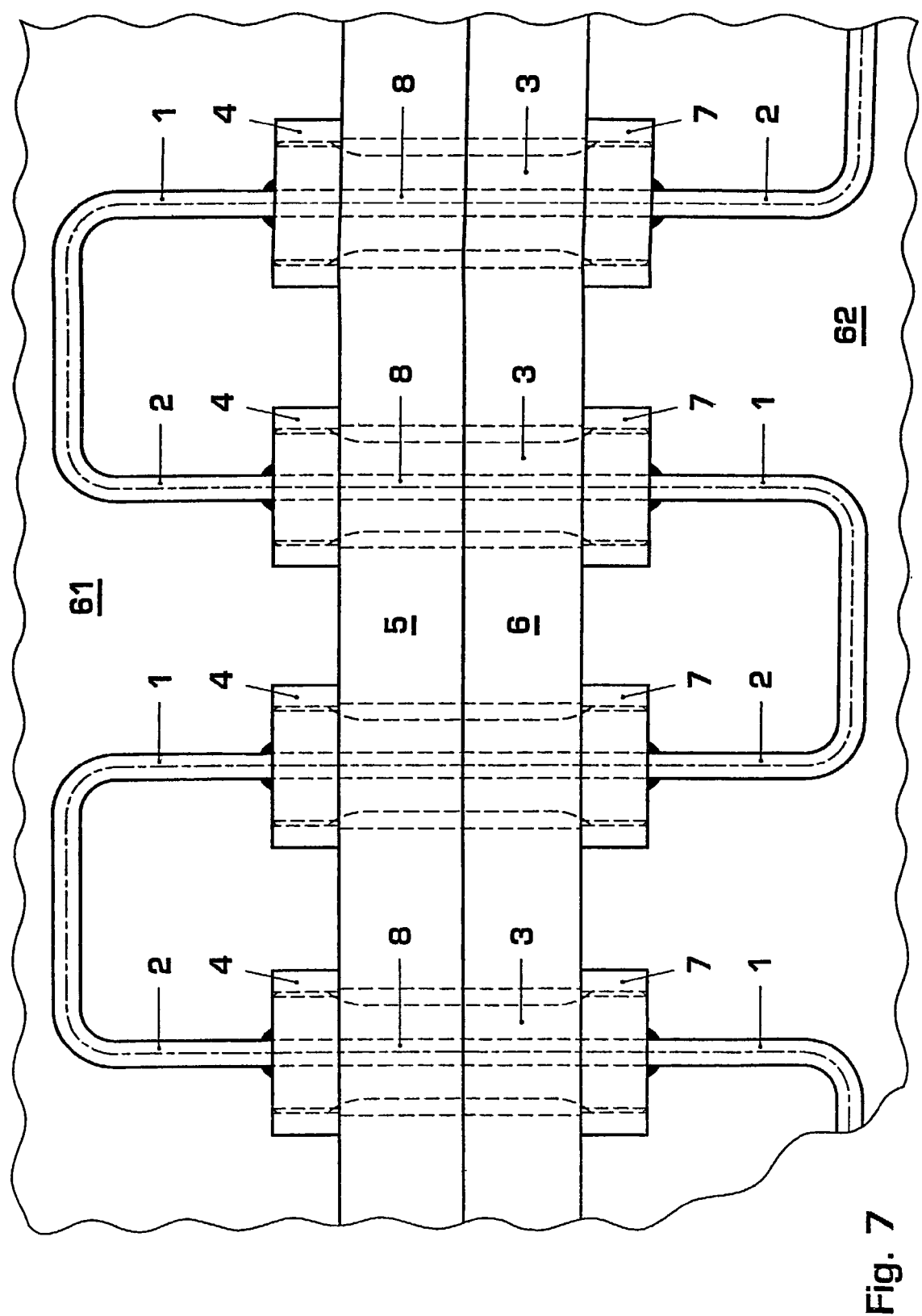
FIG. 7 shows the cross-section of an arrangement for cooling or heating a flange bolt that is connected in series with the same type of arrangement for further bolts.

FIG. 7 shows a portion of the upper half 61 of a turbine casing and the lower half 62 of a turbine casing held together by an upper flange 5 and lower flange 6. They are pressed together by several bolts and nuts 4 und 7. Each bolt has a cooling or heating arrangement according to the invention with a borehole 8. Each end of the boreholes 8 are connected to inlet and outlet pipes 1 and 2. The arrangements for cooling and heating for each bolt are connected in series in that the outlet pipe 2 of one bolt is connected to the inlet pipe 1 of a next bolt.

In the figures the numerals refer to the following features:
1 pipe for cooling fluid to flow to the bolt to be cooled
2 pipe for the cooling fluid to flow away from the cooled bolt
3 bolt to be cooled
4 nut
5 upper flange
6 lower flange
7 nut
8 axial bore hole in flange bolt
10 insulation
21 outer casing, upper half
22 outer casing flange, upper flange
23 outer casing, lower half
24 outer casing flange, lower half
25 flange bolt and nut for outer casing
26 flange plane between upper and lower half of outer turbine casing
31 inner casing, upper half
32 inner casing flange, upper half
33 inner casing, lower half
34 inner casing flange, lower half
35 flange bolt and nut for inner casing
36 flange plane between upper and lower half of inner turbine casing 40 radial bore holes in flange bolt
41 space in flange boring between bolt and flange
51 lower locking screw
52 upper locking screw
61 upper half of casing
62 lower half of casing

The invention claimed is:

1. An arrangement for cooling or heating at least one bolt that fastens an upper and lower half of a flange in a turbine,
wherein the at least one bolt is arranged in a particular radial direction of the upper and lower flange in a boring extending through the upper and lower half of the flange, and wherein the at least one bolt comprises one or more boreholes extending axially through the at least one bolt, and one or more inlet pipes each connected to a first end of each of the one or more boreholes; and
wherein the one or more inlet pipes lead a heating or cooling fluid into the one or more boreholes,
and one or more outlet pipes are each connected to a second end of the one or more boreholes, wherein the one or more outlet pipes lead said heating or cooling fluid out of the one or more boreholes, and the at least one bolt is arranged in the axial or longitudinal direction of the upper and lower half of flange;
wherein the one or more boreholes extend axially through the length of the at least one bolt and the one or more inlet and outlet pipes are connected to the ends of the axially extending boreholes; and
wherein the at least one bolt comprises additional radial boreholes that extend from an axially extending borehole to an open space between the at least one bolt and the walls of the boring in the upper and lower halves of the flange, in which the at least one bolt is placed.

2. The arrangement according to claim 1, wherein in order for natural convection to take place through the one or more boreholes in the at least one bolt, the one or more inlet and outlet pipes are each open to the atmosphere.

3. The arrangement of claim 1, comprising a plurality of bolts.

4. A system for controlling a mass flow of a cooling or heating fluid in combination with an arrangement for cooling or heating at least one bolt that fastens an upper and lower half of a flange in a turbine,
wherein the at least one bolt is arranged in a particular radial direction of the upper and lower flange in a boring extending through the upper and lower half of the flange, and wherein the at least one bolt comprises one or more boreholes extending axially through the bolt, and one or more inlet pipes each connected to a first end of each of the one or more boreholes;
the one or more inlet pipes lead a heating or cooling fluid into the one or more boreholes,
and one or more outlet pipes each connected to a second end of the one or more boreholes, wherein the one or more outlet pipes lead said heating or cooling fluid out of the one or more boreholes, and the at least one bolt is arranged in the axial or longitudinal direction of the upper and lower half of the flange; and
comprising a controller, one or several temperature measurement devices, and a valve arranged in one of the pipes arranged at the at least one bolt, wherein the controller determines an amount of heat added to or removed from the at least one bolt, and the valve is set according to a difference in fluid temperature before and after the at least one bolt.

5. The system according to claim 4 wherein the one or more boreholes extend axially through the length of the at least one bolt and the one or more inlet and outlet pipes are connected to the ends of the axially extending boreholes.

6. The system according to claim 4 wherein the arrangement comprises a fan or ventilator positioned either before or in an inlet pipe or in or after an outlet pipe.

7. The system according to claim 4 wherein the one or more inlet pipes are connected to a line for the extraction of pressurized fluid from the turbine.

8. The system according to claim 4 wherein the at least one bolt is applied to the flange of an inner or outer casing of the turbine, to a flange joint, to flanges for blade carriers, or to flanges for seal carriers.

9. The system according to claim 4 wherein the at least one bolt is a through-bolt.

10. The system according to claim 4 wherein the at least one bolt comprises one or two resilient sleeves.

11. The system according to claim 4 wherein the at least one bolt is applied to the insulated outer casing or pipe flanges of the steam turbine and the at least one bolt comprises one or two encapsulated nuts and one or two locking screws.

12. The system according to claim 4, comprising a plurality of bolts.

13. The system according to claim 4, wherein the heating or cooling fluid is nitrogen.

* * * * *